(12) United States Patent
Jung et al.

(10) Patent No.: US 11,114,039 B2
(45) Date of Patent: Sep. 7, 2021

(54) MICRO-DISPLAY DEVICE AND METHOD OF DRIVING SAME

(71) Applicant: LG Display Co., Ltd., Seoul (KR)

(72) Inventors: Sojung Jung, Gyeonggi-do (KR); Beom-Jin Kim, Seoul (KR); Bongchoon Kwak, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/702,922

(22) Filed: Dec. 4, 2019

(65) Prior Publication Data

US 2020/0184904 A1 Jun. 11, 2020

(30) Foreign Application Priority Data

Dec. 11, 2018 (KR) ........................ 10-2018-0158866

(51) Int. Cl.
*G09G 3/32* (2016.01)
*G09G 3/3291* (2016.01)
*G02B 27/01* (2006.01)

(52) U.S. Cl.
CPC ......... *G09G 3/3291* (2013.01); *G02B 27/017* (2013.01); *G02B 2027/0178* (2013.01); *G09G 2310/08* (2013.01)

(58) Field of Classification Search
None
See application file for complete search history.

(56) References Cited

U.S. PATENT DOCUMENTS

| 2005/0062710 A1* | 3/2005 | Kasai | G09G 3/3225 |
| | | | 345/99 |
| 2016/0141352 A1* | 5/2016 | Sung | G11C 19/287 |
| | | | 257/40 |
| 2018/0247587 A1* | 8/2018 | Kimura | G09G 3/3233 |
| 2020/0090630 A1* | 3/2020 | Wang | G09G 3/3233 |

* cited by examiner

*Primary Examiner* — Joseph R Haley
(74) *Attorney, Agent, or Firm* — Polsinelli PC

(57) ABSTRACT

A micro-display device comprises a silicon substrate in which a plurality of gate lines, a plurality of data lines, a plurality of emission signal lines, and a plurality of subpixels are disposed; a gate driver circuit disposed on a first side of a pixel array to drive the plurality of gate lines; an emission driver circuit driving the plurality of emission signal lines and disposed on a second side of the pixel array different from the first side of the pixel array where the gate driver circuit is disposed; a data driver circuit disposed on a third side of the pixel array to drive the plurality of data lines; a memory storing duty data regarding duty ratios of an emission signal applied to the plurality of emission signal lines; and a control circuit controlling signals applied to the gate driver circuit, the data driver circuit and the emission driver circuit, wherein the control circuit is set to have different emission times with respect to subpixels connected to the plurality of emission signal lines according to the duty data stored in the memory.

12 Claims, 12 Drawing Sheets

MICRO-DISPLAY DEVICE AND METHOD OF DRIVING SAME

CROSS REFERENCE TO RELATED APPLICATION

This application claims priority from Korean Patent Application No. 10-2018-0158866, filed on Dec. 11, 2018, which is hereby incorporated by reference in its entirety.

BACKGROUND

Field of the Disclosure

The present disclosure relates to a display device, and more particularly, to a micro-display device and a method of driving the same.

Description of the Background

A display device includes a display panel in which a plurality of subpixels is arrayed and a variety of driver circuits, such as a source driver circuit and a gate driver circuit, for driving the display panel. In the display panel of such a display device, transistors, a variety of electrodes, and a variety of signal lines are disposed on a glass substrate, and driver circuits implementable as integrated circuits (ICs) are mounted on a printed circuit and are electrically connected to the display panel via the printed circuit. However, this structure may not be suitable for small display devices, despite being suitable for large display devices.

A variety of electronic devices, such as a virtual reality (VR) device and an augmented reality (AR) device, requiring a small display device, have been devised. Accordingly, micro-display devices designed to have an extremely small size have been introduced.

A micro-display device is implemented as a semiconductor chip in the form of an integrated circuit (IC) provided on a silicon (Si) substrate (e.g. a Si semiconductor substrate). In many cases, not only a pixel array, but also a variety of driver circuits, is integrated.

Here, electric power is supplied to a micro-display device via a power line extending from a portion of a pixel array. A luminance deviation may be caused due to the length of a line, through which electric power is supplied.

In order to reduce such a luminance deviation, data voltages having different weight may be applied or luminance compensation values may be separately used according to data lines of the pixel array, respectively. However, this method may consume a large amount of time with calculations for luminance compensation, and in the process of controlling the data voltage, luminance compensation may not be properly performed, which is problematic.

Accordingly, a method able to effectively compensate for luminance deviations according to power lines in micro-display devices is required.

SUMMARY

Various aspects of the present disclosure provide an emission driver circuit, micro-display device and a method of driving the same, able to effectively compensate for luminance deviations.

Also provided are an emission driver circuit, a micro-display device and a method of driving the same, able to effectively compensate for luminance deviations by setting different emission times according to emission signal lines.

Also provided are an emission driver circuit, a micro-display device and a method of driving the same, having an efficient structure by which different emission times can be set according to emission signal lines.

According to an aspect of the present disclosure, a micro-display device may include: a silicon substrate in which a plurality of gate lines, a plurality of data lines, a plurality of emission signal lines, and a plurality of subpixels are disposed; a gate driver circuit disposed on a first side or a second side of a pixel array to drive the plurality of gate lines; an emission driver circuit disposed on the first side or the second side of the pixel array, opposite to the gate driver circuit with respect to the pixel array, to drive the plurality of emission signal lines; a data driver circuit disposed on a third side of the pixel array to drive the plurality of data lines; a memory storing duty data regarding duty ratios of an emission signal applied to the plurality of emission signal lines; and a control circuit controlling signals applied to the gate driver circuit, and the data driver circuit, and controlling the emission driver circuit so that different emission times are set to subpixels connected to the plurality of emission signal lines, among the plurality of subpixels, according to the duty data stored in the memory.

The memory may be disposed within the control circuit.

The duty data may have different values according to the plurality of emission signal lines.

The duty data may be determined such that an emission signal line located farther from the data driver circuit, among the plurality of emission signal lines, has a longer emission time.

The emission driver circuit may include: an emission shifter sequentially shifting the emission signal and supplying the shifted emission signal to the plurality of emission signal lines; and an emission controller controlling the emission times according to the plurality of emission signal lines.

The emission shifter may include a single emission shifter connected to the plurality of emission signal lines.

The emission controller may include: a duty register receiving the duty data stored in the memory; a counter counting counter clock signals; and a comparator comparing a counting value, obtained by counting the counter clock signals by the counter, with the duty data, if the counting value is smaller than the duty data, maintaining the emission signal at a level, at which the subpixels are turned on, and if the counting value is equal to the duty data, transiting the emission signal to a level, at which the subpixels are turned off.

The counter clock signals may be generated from a gate clock signal or a source clock signal.

According to an aspect of the present disclosure, provided is an emission driver circuit disposed on a silicon substrate in which a plurality of gate lines, a plurality of data lines, a plurality of emission signal lines, and a plurality of subpixels are disposed, opposite to a gate driver circuit with respect to a pixel array, to drive the plurality of emission signal lines, the gate driver circuit driving the plurality of gate lines. The emission driver circuit may include: an emission shifter sequentially shifting an emission signal and supplying the shifted emission signal to the plurality of emission signal lines; and an emission controller controlling an emission time of the emission signal using duty data having different values according to the plurality of emission signal lines.

According to an aspect of the present disclosure, provided is a method of driving a micro-display device including a silicon substrate in which a plurality of gate lines, a plurality of data lines, a plurality of emission signal lines, and a plurality of subpixels are disposed. The method may include: applying an emission signal by sequentially shifting the emission signal according to the plurality of emission signal lines; receiving duty data having different values according to the plurality of emission signal lines; counting counter clock signals; comparing a counting value, obtained by counting the counter clock signals, with the duty data; and if the counting value is smaller than the duty data, maintaining the emission signal at a level, at which one or more corresponding subpixels are turned on, and if the counting value is equal to the duty data, transiting the emission signal, applied to a corresponding emission signal line among the plurality of emission signal lines, to a level, at which the one or more subpixels are turned off.

According to aspects, the micro-display device and the method of driving the same can effectively compensate for luminance deviations caused by electric lines.

In addition, according to aspects, the micro-display device and the method of driving the same can effectively compensate for luminance deviations by setting different emission times according to emission signal lines.

In addition, the micro-display device and the method of driving the same have an efficient structure by which different emission times can be set according to emission signal lines.

DESCRIPTION OF THE DRAWINGS

The above aspects, features, and advantages of the present disclosure will be more clearly understood from the following detailed description, taken in conjunction with the accompanying drawings, in which.

DETAILED DESCRIPTION

Figure 1:
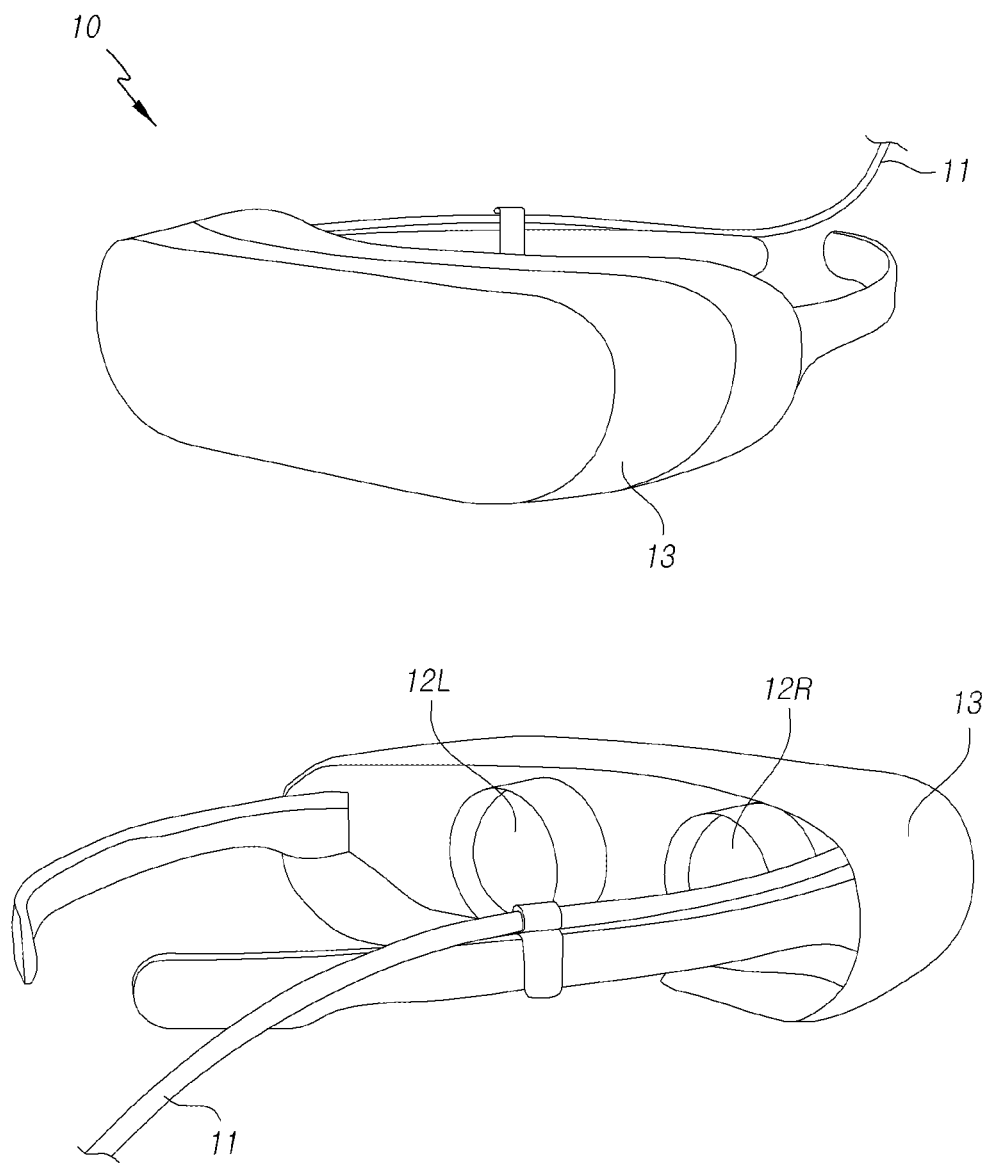
FIG. 1 illustrates an example of an electronic device using a micro-display device according to aspects of the present disclosure.

The advantages and features of the present disclosure and methods of the realization thereof will be apparent with reference to the accompanying drawings and detailed descriptions of the aspects. The present disclosure should not be construed as being limited to the aspects set forth herein and may be embodied in many different forms. Rather, these aspects are provided so that the present disclosure will be thorough and complete, and will fully convey the scope of the present disclosure to a person having ordinary skill in the art. The scope of the present disclosure shall be defined by the appended Claims.

The shapes, sizes, ratios, angles, numbers, and the like, inscribed in the drawings to illustrate exemplary aspects are illustrative only, and the present disclosure is not limited to the aspects illustrated in the drawings. Throughout this document, the same reference numerals and symbols will be used to designate the same or like components. In the following description of the present disclosure, detailed descriptions of known functions and components incorporated into the present disclosure will be omitted in the case that the subject matter of the present disclosure may be rendered unclear thereby. It will be understood that the terms "comprise," "include," "have," and any variations thereof used herein are intended to cover non-exclusive inclusions unless explicitly described to the contrary. Descriptions of components in the singular form used herein are intended to include descriptions of components in the plural form, unless explicitly described to the contrary.

In the analysis of components according to exemplary aspects, it shall be understood that an error range is included therein, even in the case in which there is no explicit description thereof.

It will also be understood that, while terms, such as "first," "second," "A," "B," "(a)," and "(b)," may be used herein to describe various elements, such terms are merely used to distinguish one element from other elements. The substance, sequence, order, or number of such elements is not limited by these terms. It will be understood that when an element is referred to as being "connected," "coupled," or "linked" to another element, not only can it be "directly connected, coupled, or linked" to the other element, but it can also be "indirectly connected, coupled, or linked" to the other element via an "intervening" element. In the same context, it will be understood that when an element is referred to as being formed "on" or "under", not only can it be directly located on or under the another element, but it can also be indirectly located on or under the another element via an intervening element.

In addition, terms, such as "first" and "second" may be used herein to describe a variety of components. It should be understood, however, that these components are not limited by these terms. These terms are merely used to discriminate one element or component from other elements or components. Thus, a first element referred to as first hereinafter may be a second element within the spirit of the present disclosure.

The features of exemplary aspects of the present disclosure may be partially or entirely coupled or combined with each other and may work in concert with each other or may operate in a variety of technical methods. In addition, respective exemplary aspects may be carried out independently or may be associated with and carried out in concert with other aspects.

Hereinafter, aspects of the present disclosure will be described in detail with reference to the accompanying drawings.

FIG. 1 illustrates an example of an electronic device using a micro-display device according to aspects. of the present disclosure Referring to FIG. 1, an electronic device 10 using a micro-display device according to aspects may be a head-mounted display (HMD) device, a type of wearable device, able to display augmented reality images or virtual reality images.

The term "micro" used herein may mean that the size of the micro-display device is significantly small, or that the micro-display device is fabricated by microscopic processing, even if the micro-display device does not have a small size.

The electronic device 10 may include an image signal input device 11, to which image data is input, a first display device 12L to display a first image (e.g. a left-eye image) on the basis of an image signal, a second display device 12R to display a second image (e.g. a right-eye image) on the basis of the image signal, and a housing 13 accommodating the image signal input device 11, the first display device 12L, and the second display device 12R.

The image signal input device 11 may include a cable, a wireless communications module, or the like, connected to an image output terminal (e.g. a smartphone). Even in the case that the image signal input device 11 is illustrated as being a wired line (e.g. a cable) in FIG. 1, the image signal input device 11 may be implemented using a wireless interface.

The first display device 12L and the second display device 12R are display devices located in positions corresponding to the left and right eyes of a user. Each of the first display device 12L and the second display device 12R may include the entirety or a portion of a micro-display device. The first display device 12L, the second display device 12R, and the driver circuit driving the display devices 12L and 12R may be collectively referred to as a display module or a micro-display device.

Herein, the first display device 12L and the second display device 12R will be described as being organic light-emitting diode (OLED) display devices in the form of micro-display devices, but the present disclosure is not limited thereto.

Figure 2:
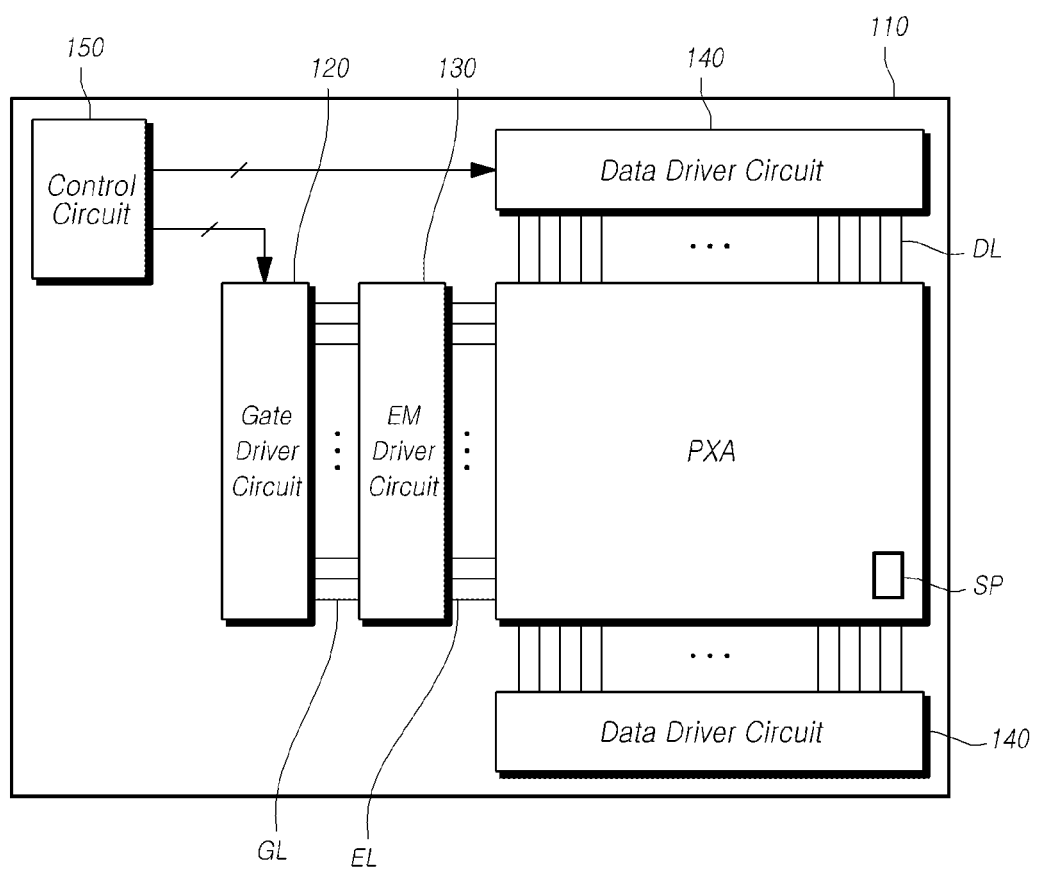
FIG. 2 illustrates a schematic system configuration of the micro-display device according to aspects of the present disclosure.

FIG. 2 illustrates a schematic system configuration of the micro-display device according to aspects of the present disclosure.

Referring to FIG. 2, the micro-display device according to aspects includes a pixel array PXA comprised of a plurality of subpixels SP arranged in a pixel array zone (PAZ) of a silicon substrate 110 and driver circuits disposed in a circuit zone (CZ) of the silicon substrate 110.

The silicon substrate 110 may be a p-Si substrate or an n-Si substrate. The term "p" used herein means holes, while the term "n" used herein means electrons. The silicon substrate 110 may include the pixel array zone (PAZ), the circuit zone (CZ), and the like. The circuit zone of the silicon substrate 110 may be located at the periphery of the silicon substrate 110. For example, the circuit zone may be present on one, two, or three sides of the pixel array zone, or may be present while surrounding the pixel array zone.

In a case in which the micro-display device is used in the electronic device 10, the pixel arrays PXA may be disposed on separate substrates in a one-to-one relationship, such that the first display device 12L displaying left-eye images and the second display device 12R displaying right-eye images are separated from each other. In this case, the first display device 12L may be disposed on a substrate of a first display panel, while the second display device 12R may be disposed on a substrate of a second display panel. In another aspect, the first display device 12L and the second display device 12R may be disposed on a single substrate such that locations thereof are separated from each other. In this case, the first display device 12L and the second display device 12R may be disposed on a single display panel so as to be separated from each other. In a case in which the first display device 12L and the second display device 12R are separated from each other, data lines DL, gate lines GL, and the pixel arrays PXA thereof may be separated from each other. Alternatively, even in the case that the first display device 12L and the second display device 12R are separated from each other, at least a portion of the driver circuits may be shared, since the first and second display devices 12L and 12R may be driven using a single driver signal system.

The driver circuit of the micro-display device may include a gate driver circuit 120, an emission (EM) driver circuit 130, a data driver circuit 140, and a control circuit 150. In addition, although not shown in the drawings, a power supply circuit supplying electric power to drive the gate driver circuit 120, the EM driver circuit 130, the data driver circuit 140, and the control circuit 150 may be further included.

The gate driver circuit 120 sequentially drives a plurality of gate lines GL by sequentially supplying a scan signal SCAN to the plurality of gate lines GL. Here, the gate driver circuit 120 may also be referred to as a scanning driver circuit or a gate driver integrated circuit (GDIC).

The gate driver circuit 120 sequentially supplies the scan signal SCAN having an on or off voltage to the plurality of gate lines GL, under the control of the control circuit 150. In this regard, the gate driver circuit 120 may include a shift register, a level shifter, and the like.

The gate driver circuit 120 may be located on one side (e.g. to the left or right) of the pixel array PXA, or in some cases, may be located on both sides (e.g. to the left and right) of the pixel array PXA depending on the driving system, the design, or the like. Herein, the gate driver circuit 120 is illustrated as being located to the left of the pixel array PXA.

The gate lines GL may not only include lines through which the scan signal SCAN is supplied, but also a plurality of emission signal lines EL through which an emission signal EM is supplied.

The EM driver circuit 130 outputs and supplies the emission signal EM to the pixel array PXA through the emission signal lines EL, under the control of the control circuit 150. The EM driver circuit 130 sequentially supplies the emission signal EM to the emission signal lines EL by shifting the emission signal EM using a shift register. Here, under the control of the control circuit 150, the EM driver circuit 130 can drive the pixel array PXA at a predetermined duty ratio, e.g. 50%, by repeatedly toggling the emission signal EM during an image driving period. The shift register of the EM driver circuit 130 can be directly fabricated on a substrate of a display panel, together with the pixel array PXA, by a gate-in-panel (GIP) process.

The data driver circuit 140 drives a plurality of data lines DL by supplying image data, received from the control circuit 150, to the plurality of data lines DL. Here, the data driver circuit 140 may also be referred to as a source driver circuit or a source driver integrated circuit (SDIC).

When a specific gate line GL is opened by the gate driver circuit 120, the data driver circuit 140 converts the image data, received from the control circuit 150, into an analog data voltage VDATA and supplies the analog data voltage VDATA to the plurality of data lines DL.

The data driver circuit 140 may be located on one side of (e.g. above or below) the pixel array PXA, or may be located on both sides of (e.g. above and below) the pixel array PXA, depending on the driving system, the design, or the like. Herein, the two data driver circuits 140 are illustrated as being disposed above and below the pixel array PXA by way of example. In this case, the two data driver circuits 140 can alternatively drive the plurality of data lines DL.

For example, the first data driver circuit 140, located above the pixel array PXA, can drive the data lines DL in association with odd-numbered pixels (or subpixels), while the second data driver circuit 140, located below the pixel array PXA, can drive the data lines DL in association with even-numbered pixels (or subpixels). This is intended to widen the pitches between the plurality of data lines DL driven by the data driver circuits 140, so that the designing of the data driver circuit 140 can be facilitated and the plurality of data lines DL can be reliably driven.

The data driver circuit 140 may include a shift register, a latch circuit, a digital-to-analog converter (DAC), an output buffer, and the like. Here, the digital-to-analog converter is a component converting the image data, received from the control circuit 150, into the analog data voltage VDATA to be supplied to the data lines DL.

The control circuit 150 applies the scan signal SCAN to the pixel array PXA in timing realized by respective frames, converts image data, input from an external source, into data voltage VDATA having a data signal format readable by the data driver circuit 140, outputs the image data VDATA, and controls data driving at appropriate points in time in response to the scan signal SCAN. The control circuit 150 may be a timing controller used in typical display technology or may be a control device including a timing controller and performing other control functions.

The control circuit 150 including the timing controller, the gate driver circuit 120, the EM driver circuit 130, and the data driver circuit 140 may be collectively referred to as a display driver IC (DDI).

In the pixel array PXA, the plurality of data lines DL and the plurality of gate lines GL intersect each other, and pixels or subpixels SP are arrayed in the form of a matrix. The pixel array PXA may further include a reference voltage line commonly connected to the subpixels SP, driving voltage lines DVL through which a driving voltage ELVDD is supplied to the plurality of subpixels SP, sensing lines SL through which characteristic values of the subpixels SP are sensed, and the like.

The pixel array PXA is comprised of the plurality of pixels, each of which may be divided into a red subpixel, a green subpixel, and a blue subpixel to realize colors of light. Each of the pixels may further include a white subpixel. Wiring lines, including a single data line DL, a single gate line GL, and a single driving voltage line DVL, are connected to each of the subpixels SP.

The one-frame period may be categorized as a writing section in which image data is written due to the data voltage VDATA being applied to each of the subpixels SP and an emission section in which the subpixel SP emits light at a predetermined duty ratio in response to the emission signal EM after the writing section. In general, the emission signal EM causes the subpixel SP to emit light at a duty ratio of 50% or less during the emission section. Since the writing section is only about a single horizontal period (1H), most of a one-frame period corresponds to the emission section.

The subpixel SP charges a capacitor with the data voltage VDATA in the writing section, and repeatedly turns on and off in response to the emission signal EM. That is, the subpixel SP can be turned on and off by the voltage charged in the capacitor in the one-frame period, so that the subpixel SP can emit light at a duty ratio of 50% or less, thereby repeatedly turning on and off. As described above, the subpixel SP is turned on by the voltage charged in the capacitor after being turned off. Accordingly, the subpixel SP can display data at uniform luminance levels at a duty ratio of 50% or less during the one-frame period, with no additional data voltage VDATA being supplied thereto during the emission section after the writing section.

The control circuit 150 receives input left-eye and right-eye image data and a timing signal synchronized with the image data. The timing signal may include a vertical synchronization signal Vsync, a horizontal synchronization signal Hsync, a clock signal CLK, a data enable signal DE, and the like. The clock signal CLK may include a gate clock signal GCLK applied to the gate driver circuit and a source clock signal SCLK applied to the data driver circuit. The control circuit 150 generates a data timing control signal to control the operation timing of the data driver circuit 140, a gate timing control signal to control the operation timing of the gate driver circuit 120, and an EM timing control signal to control the operation timing of the EM driver circuit 130, on the basis of the timing signal and register set values of a display command set (DCS). The control circuit 150 can control the duty ratio of the emission signal EM using the EM timing control signal.

In addition, each of the driver circuits, disposed in the circuit zone of the silicon substrate 110, may further include a memory (MEM). The memory can temporarily store image data output from the control circuit 150, and can output the image data to the data driver circuit 140 in designated timing. The memory can be disposed within or outside of the data driver circuit 140. In a case in which the memory is disposed outside of the data driver circuit 140, the memory may be disposed between the control circuit 150 and the data driver circuit 140. In addition, the memory may further include a buffer memory to store image data received from an external source and supply stored image data to the control circuit 150.

In addition, the driver circuit, disposed in the circuit zone of the silicon substrate 110, may further include a power circuit to provide a variety of signals and voltages, necessary to drive the subpixels SP arrayed in the pixel array PXA, to other circuits or supply such signals and voltages to the pixel array PXA. The power circuit may include a power generator, such as a DC-DC converter. The power circuit can generate and output a voltage, required by the pixel array PXA, from a variety of power voltages supplied from external sources. For example, the power circuit can generate and output a driving voltage ELVDD, a base voltage ELVSS, a reference voltage VSS, and a common voltage VCOM for driving the subpixels SP.

In addition, the driver circuit, disposed in the circuit zone of the silicon substrate 110, may include an interface (INF) allowing the driver circuit to input and output signals to and from, or to communicate with, other electronic devices or components. The interface may include one or more among a low-voltage differential signaling (LVDS) interface, a mobility industry processor interface (MIPI), a serial interface, and the like.

In addition, the transistors disposed in the pixel array zone of the silicon substrate 110 and the driver circuits including the transistors disposed in the circuit zone of the silicon substrate 110 can be fabricated by the same process.

Accordingly, it is possible to fabricate not only the pixel array PXA but also the data driver circuit 140, the gate driver circuit 120, the control circuit 150, and the EM driver circuit 130 on the silicon substrate 110, thereby miniaturizing the micro-display device and easily and rapidly performing the fabrication process thereof. The entire or a portion of the micro-display device can be fabricated in a fabrication process of a silicon wafer.

Figure 3:
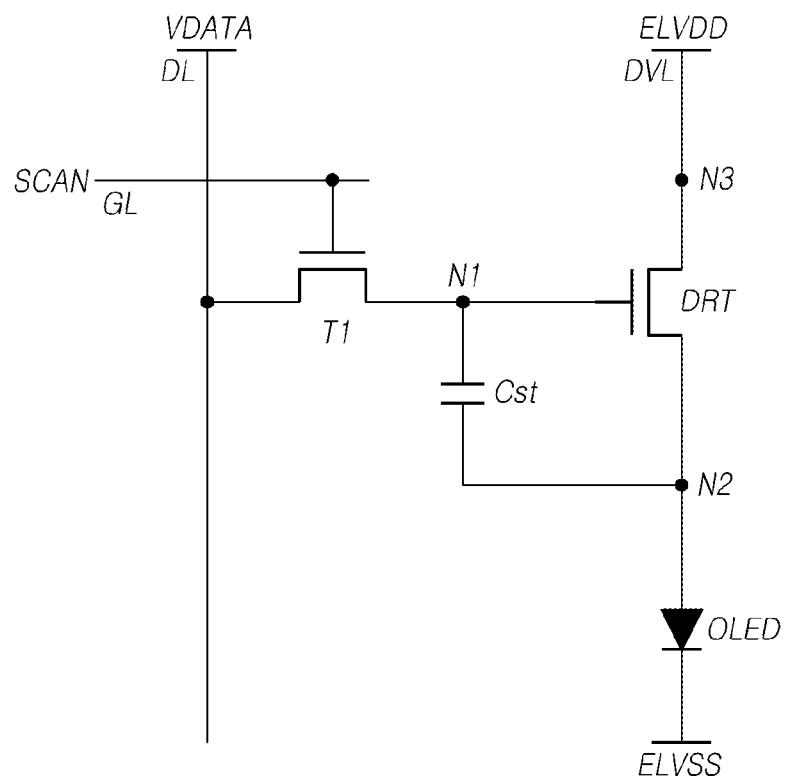
FIG. 3 illustrates an example of a subpixel structure of the micro-display device according to aspects of the present disclosure.

FIG. 3 illustrates an example of a subpixel structure of the micro-display device according to aspects of the present disclosure.

Referring to FIG. 3, in the micro-display device, each of the plurality of subpixels SP includes: an organic light-emitting diode OLED; a driving transistor DRT driving the organic light-emitting diode OLED; a first transistor T1 electrically connected between a first node N1, serving as a gate node of the driving transistor DRT, and a data line DL; and a storage capacitor Cst electrically connected between the first node N1 of the driving transistor DRT and a second node N2, serving as a source node or a drain node of the driving transistor DRT.

The organic light-emitting diode OLED may include a first electrode, an organic light-emitting layer, and a second electrode. The first electrode may be an anode (or a cathode), while the second electrode may be a cathode (or an anode). A base voltage ELVSS may be applied to the second electrode of the organic light-emitting diode OLED.

The driving transistor DRT includes the first node N1, the second node N2, and a third node N3 as electrical nodes. The first node N1 of the driving transistor DRT corresponds to the gate node, and may be electrically connected to the source node or drain node of the first transistor T1. The second node N2 of the driving transistor DRT corresponds to the source node or drain node, and may be electrically connected to the first electrode of the organic light-emitting diode OLED. The third node N3 of the driving transistor DRT may be electrically connected to a driving voltage line DVL, such that a driving voltage ELVDD can be applied thereto.

The gate node of the first transistor can be on-off controlled by a scan signal SCAN applied thereto through a gate line GL, and may be electrically connected between the gate line GL and the first node of the driving transistor DRT. The drain node or source node of the first transistor T1 may be electrically connected to the data line DL, while the source node or drain node of the first transistor T1 may be electrically connected to the first node N1 of the driving transistor DRT. When the first transistor T1 is turned on by the scan signal SCAN, a data voltage VDATA, supplied through the data line DL, is transferred to the first node N1 of the driving transistor DRT.

Figure 4:
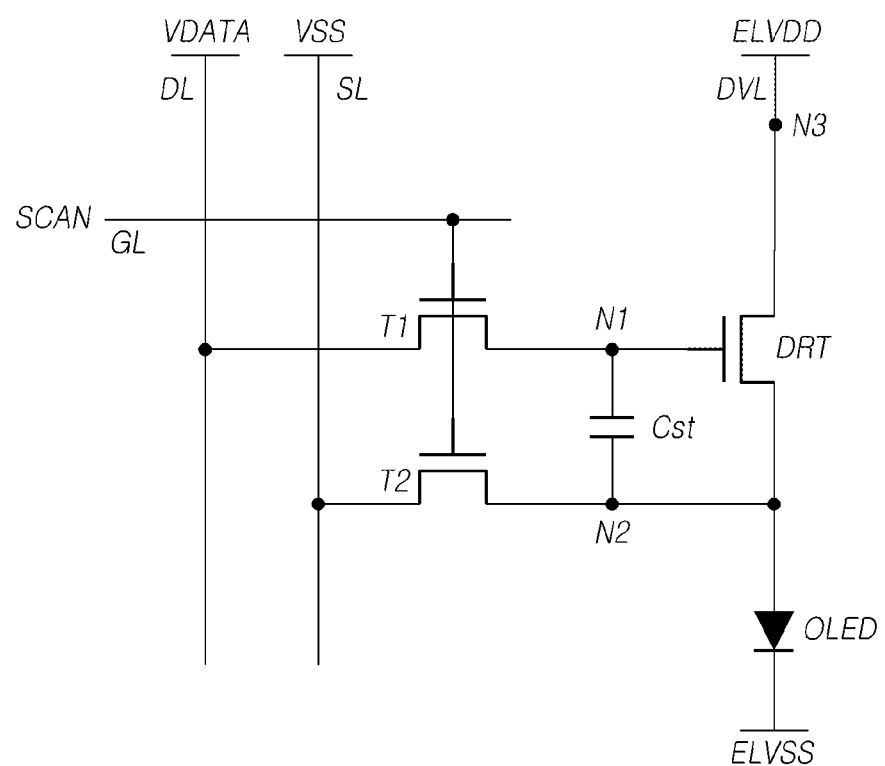
FIG. 4 illustrates another example of the subpixel structure of the micro-display device according to aspects of the present disclosure.

FIG. 4 illustrates another example of the subpixel structure of the micro-display device according to aspects of the present disclosure.

Referring to FIG. 4, each of the subpixels SP of the micro-display device may further include a second transistor T2 electrically connected between the second node N2 of the driving transistor DRT and a sensing line SL.

A gate node of the second transistor T2 may be electrically connected to the gate line GL, a drain node or source node of the second transistor T2 may be electrically connected to the sensing line SL, and the source node or drain node of the second transistor T2 may be electrically connected to second node N2 of the driving transistor DRT.

The second transistor T2 may be on-off controlled by the scan signal SCAN applied to the gate node thereof. The gate node of the first transistor T1 and the gate node of the second transistor T2 may be electrically connected to each other, and may be commonly connected to the single gate line GL. In this case, the scan signal SCAN may be applied to both the gate node of the first transistor T1 and the gate node of the second transistor T2.

Alternatively, the gate node of the first transistor T1 and the gate node of the second transistor T2 may be connected to different gate lines GL. In this case, the scan signal SCAN may be separately applied to the gate node of the first transistor T1 and the gate node of the second transistor T2.

In a case in which the second transistor T2 is turned on, a reference voltage VSS may be applied to the second node of the driving transistor DRT. In a case in which the second transistor T2 is turned off, the second node N2 of the driving transistor DRT may be electrically floated. As described above, it is possible to control the voltage state of the second node N2 of the driving transistor DRT according to the driving type and driving situation through the second transistor T2 and the sensing line SL.

Each of the driving transistor DRT, the first transistor T1, and the second transistor T2 may be an n-transistor or p-transistor. The storage capacitor Cst may be an external capacitor intentionally designed to be disposed externally of the driving transistor DRT, rather than a parasitic capacitor (e.g. Cgs or Cgd), i.e. an internal capacitor present between the first node N1, the second node N2 and the third node N3 of the driving transistor DRT.

The pixel array PXA, disposed in the pixel array zone of the silicon substrate 110, and the driver circuits, disposed in the circuit zone of the silicon substrate 110, can be fabricated by the same process. In this case, current-voltage transfer characteristics (i.e. performance or characteristics) of the transistor, located in the pixel array zone of the silicon substrate 110, and current-voltage transfer characteristics (i.e. performance or characteristics) of the transistor, located in the circuit zone of the silicon substrate 110, may be the same or substantially the same.

Figure 5:
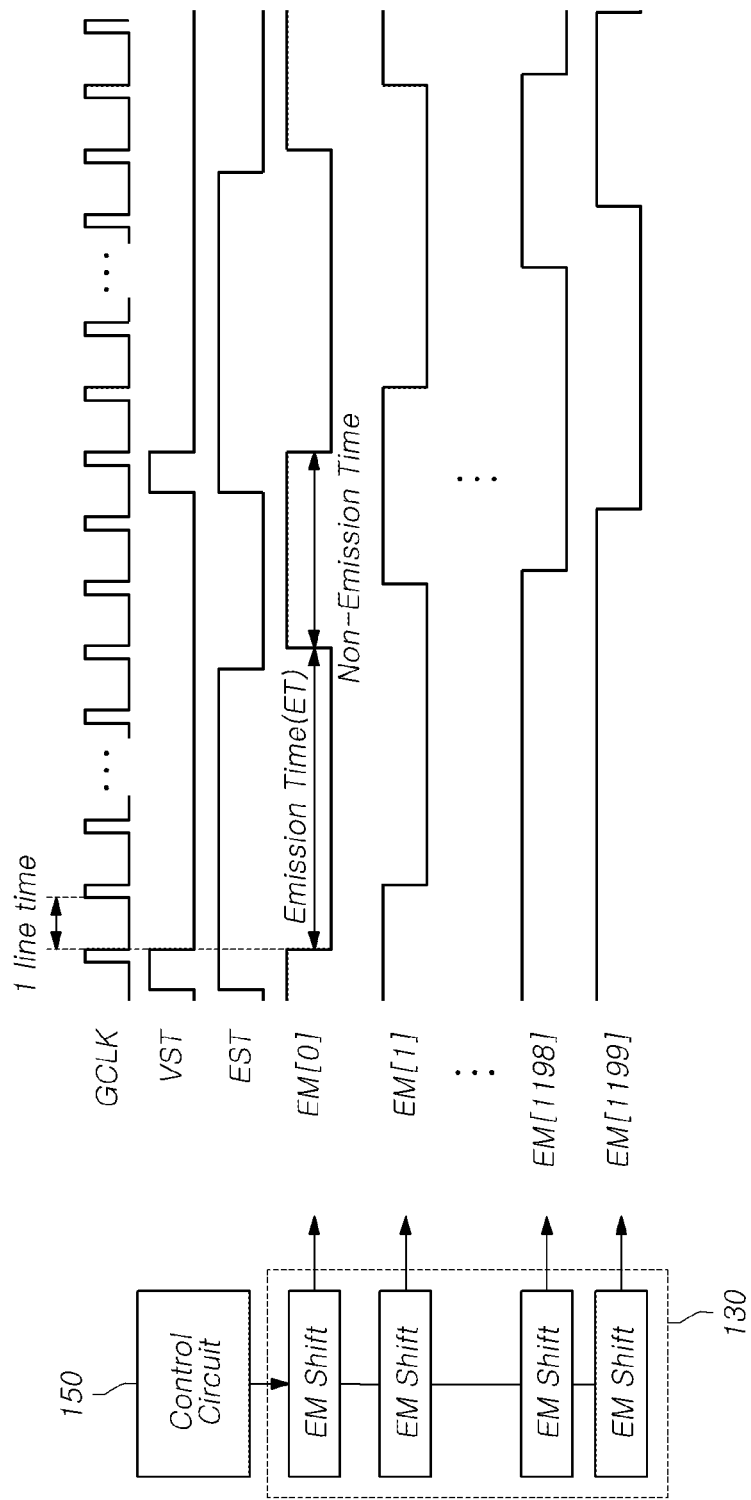
FIG. 5 is a timing diagram of an emission signal in the micro-display device, in which the emission time of each of the subpixels of the pixel array is controlled.

FIG. 5 is a timing diagram of an emission signal EM in the micro-display device, in which the emission time ET of each of the subpixels SP of the pixel array PXA is controlled.

Referring to FIG. 5, the control circuit 150 controls the EM driver circuit 130 to sequentially apply the emission signal EM, by which the emission time ET of the pixel array PXA is controlled, to the gate lines GL. Herein, the micro-display device having a 1,920×1,200 resolution will be illustrated by way of example. The micro-display device having the 1,920×1,200 resolution may include 1,920 data lines DL and 1,200 gate lines GL. The subpixels SP may be arrayed at points of intersection of the gate lines GL and the data lines DL.

The EM driver circuit 130 outputs the emission signal EM under the control of the control circuit 150, and supplies the emission signal EM to the pixel array PXA through the emission signal lines EL. The EM driver circuit 130 shifts the emission signal EM using the shift register EM Shift provided for each of the gate lines GL, thereby sequentially supplying the emission signal EM to the emission signal lines EL. Here, the EM driver circuit 130 drives the pixel array PXA at the same duty ratio by repeatedly toggling the emission signal EM during an image driving period while under the control of the control circuit 150. For example, at a point in time at which an emission control signal VST is applied, an EM timing control signal EST is applied concurrently. At a point in time at which the emission control signal VST is transited from a high level to a low level, the emission signal EM is transited to a low level. Here, while the emission signal EM is being applied at a low level in a section in which the EM timing control signal EST is maintained at a high level, the corresponding subpixel SP emits light. When a gate clock signal GCLK has counted a predetermined number, the emission signal EM is transited to a high level, thereby completing the emission time ET. In general, the emission time ET of the emission signal EM is determined equally for the respective gate lines GL.

Figure 6:
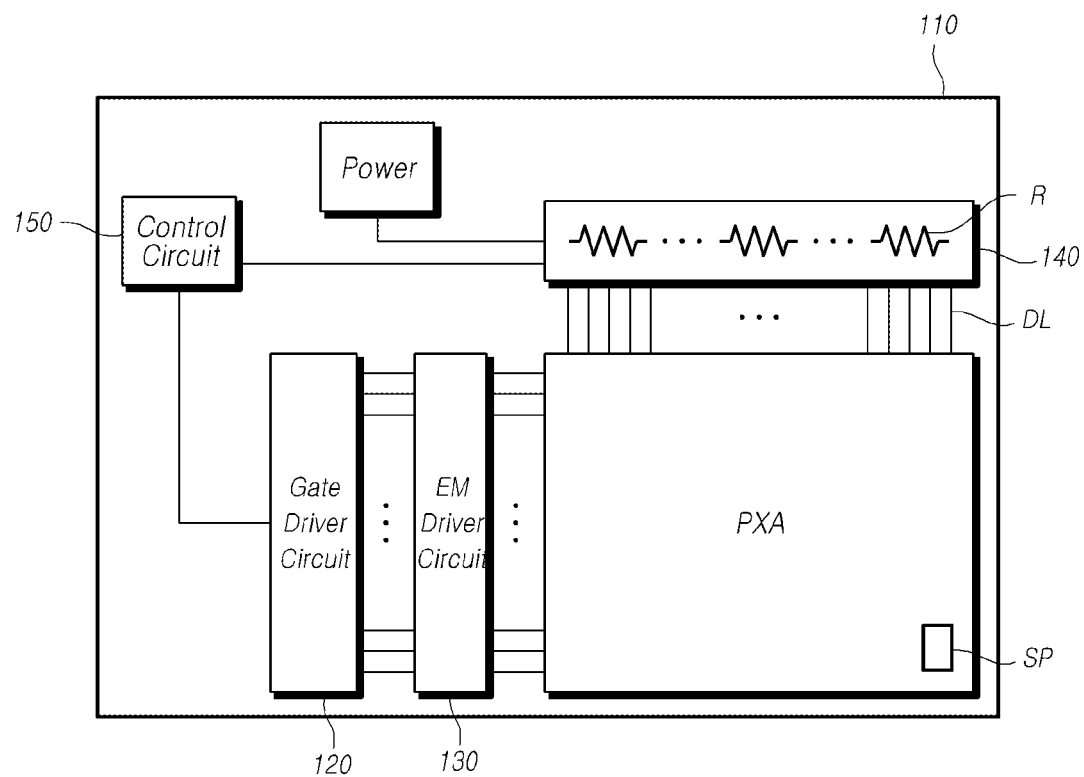
FIG. 6 conceptually illustrates a wiring structure for the data voltage applied to the pixel array via the data driver circuit in the micro-display device.

FIG. 6 conceptually illustrates a wiring structure for the data voltage VDATA applied to the pixel array via the data driver circuit in the micro-display device. In FIG. 6, the data driver circuit 140 is only illustrated as being located above the pixel array PXA for the sake of brevity.

Referring to FIG. 6, the micro-display device is used as a wearable device able to display augmented reality images or virtual reality images. Thus, the control circuit 150 supplying the data voltage VDATA and the power circuit supplying other types of electric power are located to the left or right of the pixel array PXA. Accordingly, the data voltage VDATA, supplied through the control circuit 150, or the electric power, applied through the power circuit, is applied in a horizontal direction laterally from a side (e.g. an edge) of the pixel array PXA.

Here, since an electric line, through which the data voltage VDATA or other types of electric power are supplied, has a resistance component (R), the data voltage VDATA or the voltage of the electric power, generated by the control circuit 150 or the power circuit, is reduced while being transferred through the electric line, so that the data voltage VDATA or the electric power may not be supplied in an accurate amount. As a result, luminance deviations may be more obvious in a direction away from the side of the pixel array PXA.

To solve this problem, a gamma compensation voltage generator circuit (or gamma generator) may be additionally provided in the circuit zone of the silicon substrate 110 or the control circuit 150 may apply different weights to the data voltage VDATA according to the data lines DL of the data driver circuit 140. Here, the gamma compensation voltage generator circuit can compensate for luminance deviations among the subpixels SP by outputting different gamma compensation voltages according to the subpixels SP by dividing the driving voltage.

However, this method has the following problems. In the process in which the control circuit 150 applies weights to the data voltage VDATA applied to the data driver circuit 140, a large amount of calculation for the data voltage VDATA may be required according to the size of the pixel array PXA, thereby consuming a large amount of time. In a case in which the gamma compensation voltage generator circuit is used, appropriate luminance compensation is difficult, due to the data voltage VDATA being directly controlled.

To solve such problems, the present disclosure can effectively compensate for luminance deviations according to the data lines DL or the power lines by adjusting the emission time ET according to the gate lines GL for the subpixels SP of the pixel array PXA.

In the micro-display device having the 1,920×1,200 resolution, the emission signal EM is sequentially generated for the first gate line GL0 to the 1,200$^{th}$ gate line GL1,199 and is delayed by the same intervals by the shift registers EM Shift, before being transferred to the respective gate lines GL. Here, delay times by which the emission signal EM is delayed according to the respective gate lines GL can be set by predetermined intervals by counting a clock signal, in particular, a gate clock signal GCLK. In this case, the micro-display device according to the present disclosure can compensate for the luminance deviations of the subpixels SP located remotely from the control circuit or the power circuit by adjusting the duty ratio so that, the farther a subpixel SP is located from the control circuit or the power circuit, the longer the emission time ET of the subpixel SP may be maintained to be.

In this regard, in the micro-display device according to the present disclosure, it may be effective to dispose the EM driver circuit 130 above or below the pixel array PXA.

Figure 7:
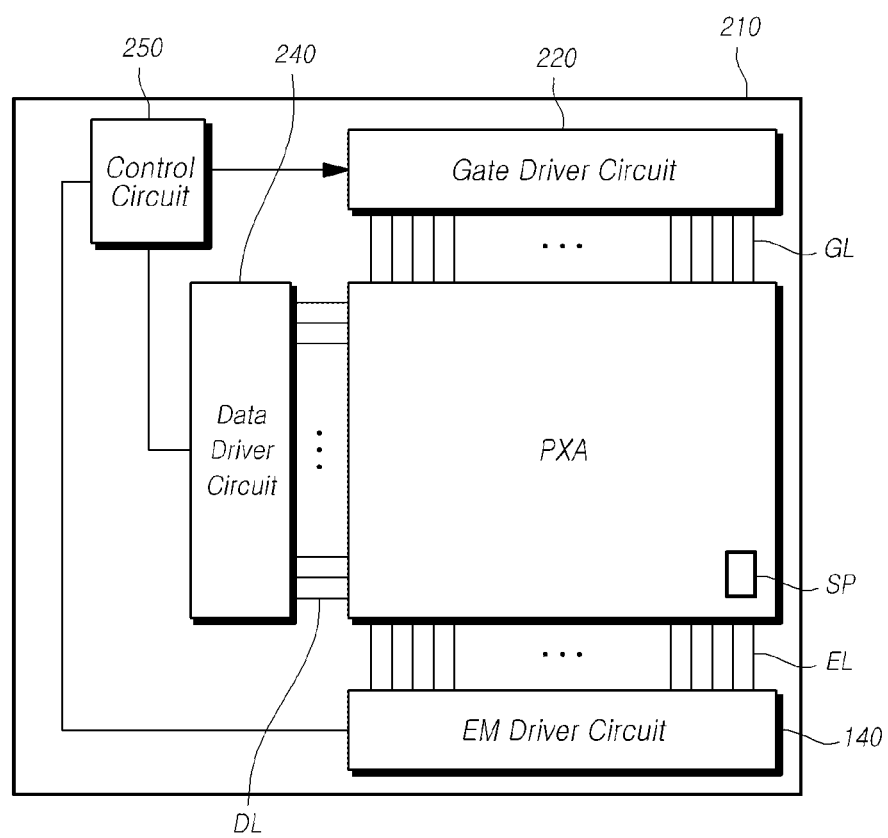
FIG. 7 illustrates a system configuration of the micro-display device according to aspects of the present disclosure.

FIG. 7 illustrates a system configuration of the micro-display device according to aspects of the present disclosure.

Referring to FIG. 7, the micro-display device according to aspects may have an EM driver circuit 230 disposed above or below the pixel array PXA, in which deviations in a data voltage VDATA or power lines may occur, in order to individually control emission times ET according to gate lines GL. In addition, the EM driver circuit 230 may be configured to be able to individually adjust the duty ratio of an emission signal EM, so that the emission signal EM has different emission times ET according to the gate lines GL.

In this regard, the micro-display device according to aspects may include: a pixel array PXA disposed in a pixel array zone (PAZ) of a silicon substrate 210 and comprised of a plurality of subpixels SP; and a plurality of driver circuits disposed in a circuit zone of the silicon substrate 210.

The silicon substrate 210 may be a p-silicon substrate or an n-silicon substrate. The silicon substrate 210 may include the pixel array zone, the circuit zone, and the like. The circuit zone of the silicon substrate 210 may be located at the periphery of the pixel array zone of the silicon substrate 210, may be present on one or more sides of the pixel array zone, or may be present while surrounding the pixel array zone.

In a case in which the micro-display device is used in an electronic device, the pixel arrays PXA may be disposed on separate substrates in a one-to-one relationship, such that a first display device displaying left-eye images and a second display device displaying right-eye images are separated from each other. Alternatively, the first display device and the second display device may be disposed on a single substrate such that locations thereof are separated from each other. In this case, the first display device and the second display device may be disposed on a single display panel so as to be separated from each other. In a case in which the first display device and the second display device are separated from each other, data lines DL, gate lines GL, and the pixel arrays PXA thereof may be separated from each other. Even if the first display device and the second display device are separated from each other, at least a portion of the driver circuits may be shared, since the first and second display devices may be driven using a single driver signal system.

The driver circuits of the micro-display device according to the present disclosure may include a gate driver circuit 220, the EM driver circuit 230, a data driver circuit 240, and a control circuit 250. In addition, although not shown in the drawings, a power circuit supplying electric power necessary to drive the gate driver circuit 220, the EM driver circuit 230, the data driver circuit 240, the control circuit 250, and the pixel array PXA may be further included.

In the micro-display device according to the present disclosure, the gate driver circuit 220 and the EM driver circuit 230 may be respectively disposed above or below the pixel array PXA in a horizontal direction to face each other from both sides of the pixel array PXA so as to be able to adjust emission times ET of subpixels SP in the horizontal direction. Accordingly, luminance deviations caused by the data voltage VDATA or the power lines, directed horizontally, can be controlled. Here, a case in which the gate driver circuit 220 is disposed above the pixel array PXA and the EM driver circuit 230 is disposed below the pixel array PXA is illustrated by way of example.

The EM driver circuit 230 outputs an emission signal EM under the control of the control circuit 250, and supplies the emission signal EM to the pixel array PXA through the emission signal lines EL. The EM driver circuit 230 may include an EM shifter to sequentially shift the emission signal EM and supply the shifted emission signal to the plurality of emission signal lines EL and an EM controller to control emission times ET according to the emission signal lines EL. Thus, the EM driver circuit 230 can repeatedly supply the emission signal EM to the pixel array PXA under the control of the control circuit 250 during an image driving period by applying the emission signal EM at different duty ratios according to the gate lines GL. The EM shifter and the EM controller of the EM driver circuit 230 can be directly fabricated on a substrate of a display panel, together with the pixel array PXA, by a gate-in-panel (GIP) process.

The gate driver circuit 220 may be horizontally disposed on the opposite side to the EM driver circuit 230 with respect to the pixel array PXA, such that the gate driver circuit 220 and the EM driver circuit 230 face each other. As illustrated in FIG. 7, in a case in which the EM driver circuit 230 is disposed below the pixel array PXA, the gate driver circuit 220 may be horizontally disposed above the pixel array PXA. Alternatively, in a case in which the EM driver circuit 230 is disposed above the pixel array PXA, the gate driver circuit 220 may be horizontally disposed below the pixel array PXA.

The gate driver circuit 220 sequentially drives the plurality of gate lines GL by sequentially supplying a scan signal SCAN to the plurality of gate lines GL. The gate driver circuit 220 can sequentially supply the scan signal SCAN having a turn-on or turn-off voltage to the plurality of gate lines GL under the control of the control circuit 250. In this regard, the gate driver circuit 220 may include a shift register, a level shifter, or the like.

In the micro-display device having the 1,920×1,200 resolution, in a case in which the gate driver circuit 220 and the EM driver circuit 230 are respectively disposed above or below the pixel array PXA, the gate lines GL and the emission signal lines EL may be 1,920 lines.

The data driver circuit 240 drives the plurality of data lines DL by supplying image data, received from the control circuit 250, to the plurality of data lines DL. When a specific gate line GL is opened by the gate driver circuit 220, the data driver circuit 240 converts the image data, received from the control circuit 250, into an analog data voltage VDATA and supplies the analog data voltage VDATA to the plurality of data lines DL.

The data driver circuit 240 may be located on one or both sides of the pixel array PXA, depending on the driving system, the design, or the like. Herein, the single data driver circuit 240 is illustrated as being vertically disposed to the left of the pixel array PXA by way of example.

The data driver circuit 240 may include a shift register, a latch circuit, a digital-to-analog converter, an output buffer, and the like. Here, the digital-to-analog converter is a component converting the image data, received from the control circuit 250, into the analog data voltage VDATA to be supplied to the data lines DL.

The control circuit 250 applies the scan signal SCAN to the pixel array PXA in timing realized by respective frames, converts image data, input from an external source, into a data voltage VDATA having a data signal format readable by the data driver circuit 240, outputs the data voltage VDATA, and controls data driving at appropriate points in time in response to the scan signal SCAN. The control circuit 250 may be a timing controller used in typical display technology or may be a control device including a timing controller and performing other control functions. The control circuit 250 including the timing controller and the data driver circuit 240 may be collectively referred to as a display driver IC (DDI).

In the pixel array PXA, the plurality of data lines DL and the plurality of gate lines GL intersect each other, and pixels or subpixels SP are arrayed in the form of a matrix. The pixel array PXA may further include a reference voltage line commonly connected to the subpixels SP, driving voltage lines DVL through which a driving voltage ELVDD is supplied to the plurality of subpixels SP, sensing lines SL through which characteristic values of the subpixels SP are sensed, and the like.

The pixel array PXA is comprised of the plurality of pixels, each of which may be divided into a red subpixel, a green subpixel, and a blue subpixel to realize colors of light. Each of the pixels may further include a white subpixel. Wiring lines, including a single data line DL, a single gate line GL, and a single driving voltage line DVL, may be connected to each of the subpixels SP.

The one-frame period may be categorized as a writing section in which image data is written due to the data voltage VDATA being applied to each of the subpixels SP and an emission section in which the subpixel SP emits light at a predetermined duty ratio in response to the emission signal EM after the writing section. The micro-display device according to the present disclosure can control the emission times ET, in which the subpixels SP are turned on, to be set differently according to the gate lines GL. That is, the emission signal EM can be controlled to have different duty ratios when applied to different gate lines GL.

The control circuit 250 receives input left-eye and right-eye image data and a timing signal in synchronous with the image data. The timing signal may include a vertical synchronization signal Vsync, a horizontal synchronization signal Hsync, a clock signal CLK, a data enable signal DE, and the like. The control circuit 250 generates a data timing control signal to control the operation timing of the data driver circuit 240, a gate timing control signal to control the operation timing of the gate driver circuit 220, and an EM timing control signal EST to control the operation timing of the EM driver circuit 230, on the basis of the timing signal and register set values of a display command set (DCS). The control circuit 250 can control the duty ratio of the emission signal EM using the EM timing control signal EST.

In addition, each of the driver circuits, disposed in the circuit zone of the silicon substrate 210, may further include a memory. The memory can temporarily store image data output from the control circuit 250, and can output the image data to the data driver circuit 240 in designated timing. The memory can be disposed within or outside of the data driver circuit 240. In a case in which the memory is disposed outside of the data driver circuit 240, the memory may be disposed between the control circuit 250 and the data driver circuit 240. In addition, the memory may further include a buffer memory to store image data received from an external source and supply stored image data to the control circuit 250.

In addition, the driver circuit, disposed in the circuit zone of the silicon substrate 210, may further include a power circuit to provide a variety of signals and voltages, necessary to drive the subpixels SP arrayed in the pixel array PXA, to other circuits or supply such signals and voltages to the pixel array PXA. The power circuit may include a power generator, such as a DC-DC converter. The power circuit can generate and output a voltage, required by the pixel array PXA, from a variety of power voltages supplied from external sources. For example, the power circuit can generate and output a driving voltage ELVDD, a base voltage ELVSS, a reference voltage VSS, and a common voltage VCOM for driving the subpixels SP.

In addition, the driver circuit, disposed in the circuit zone of the silicon substrate 210, may include an interface allowing the driver circuit to input and output signals to and from, or to communicate with, other electronic devices or components. The interface may include one or more among a low-voltage differential signaling (LVDS) interface, a mobility industry processor interface (MIPI), a serial interface, and the like.

Figure 8:
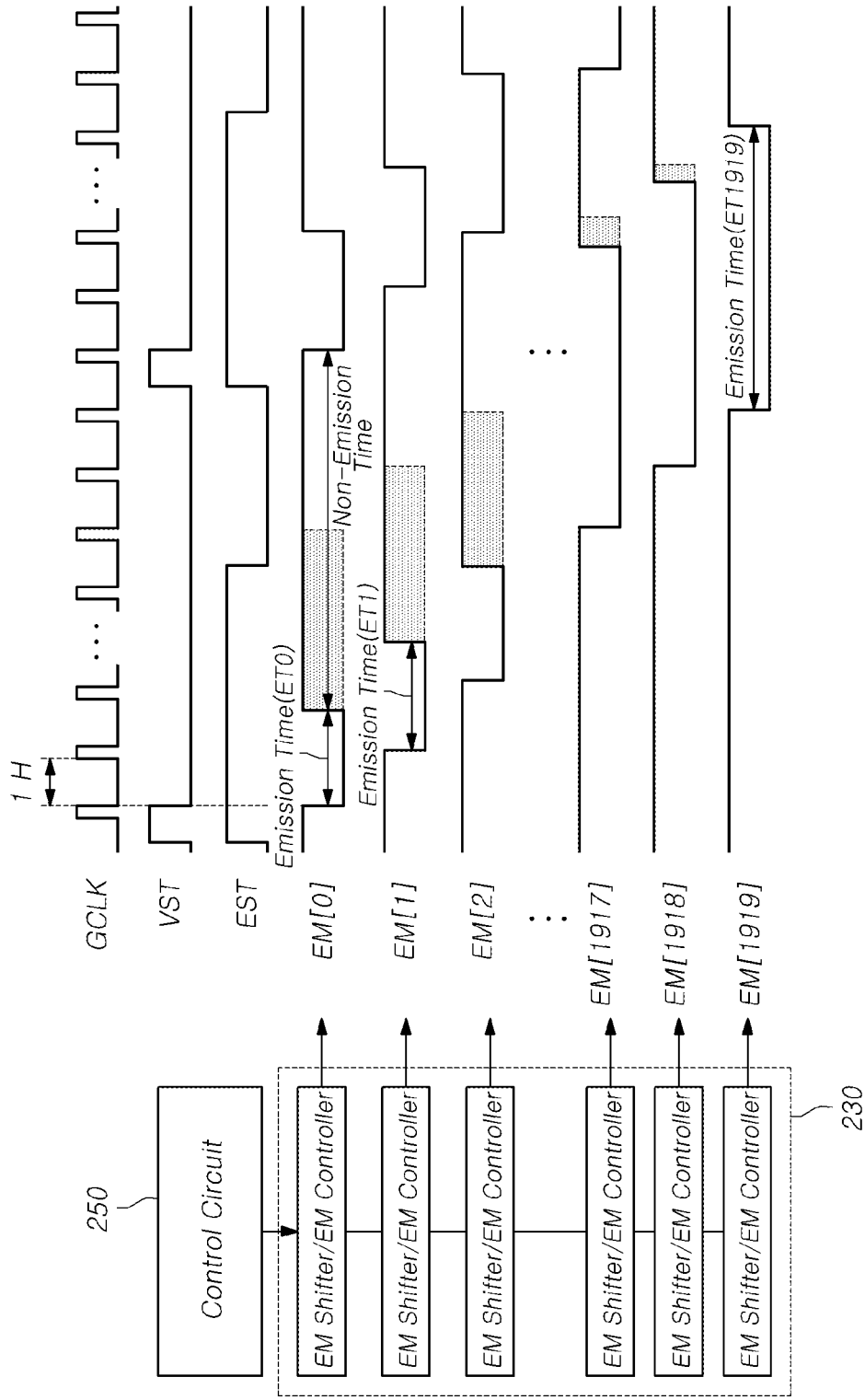
FIG. 8 is a signal timing diagram in a situation in which the micro-display device according to aspects has different emission times according to the gate lines.

FIG. 8 is a signal timing diagram in a situation in which the micro-display device according to aspects of the present disclosure has different emission times ET according to the gate lines GL.

Referring to FIG. 8, the EM driver circuit 230 in the micro-display device according to the present disclosure may include an EM shifter and an EM controller, by which different emission times ET may be set according to the gate lines GL connected to the pixel array PXA.

The EM shifter can sequentially shift the emission signal EM by the unit of a single horizontal time 1H to sequentially supply the emission signal EM to the emission signal lines EL, while the EM controller can control the duty ratio so that a emission time ET and a non-emission time are set differently according to the gate lines GL in a single period of the emission signal EM. The unit of the single horizontal time 1H, by which the emission signal EM is shifted, may vary depending on reference clock signals. Here, the single horizontal time 1H of a gate clock signal GCLK is set as a shift unit.

Here, represented is a situation in which 1,920 gate lines GL0, GL1, . . . , and GL1919 are disposed with respect to the gate driver circuit 220 and the EM driver circuit 230 disposed in a horizontal direction and different emission times ET of the emission signal EM are obtained for the respective gate lines GL in the micro-display device having a 1,920×1,200 resolution. In particular, the gate line most remote from the control circuit 250 and the power circuit (e.g. the 1920$^{th}$ gate line GL1919 in this case) can have the longest emission time ET. Accordingly, the problem in that a supply voltage is further reduced in a direction away from the control circuit 250 or the power circuit, due to a resistance component present in the wiring line, and luminance is reduced, can be overcome.

Figure 9:
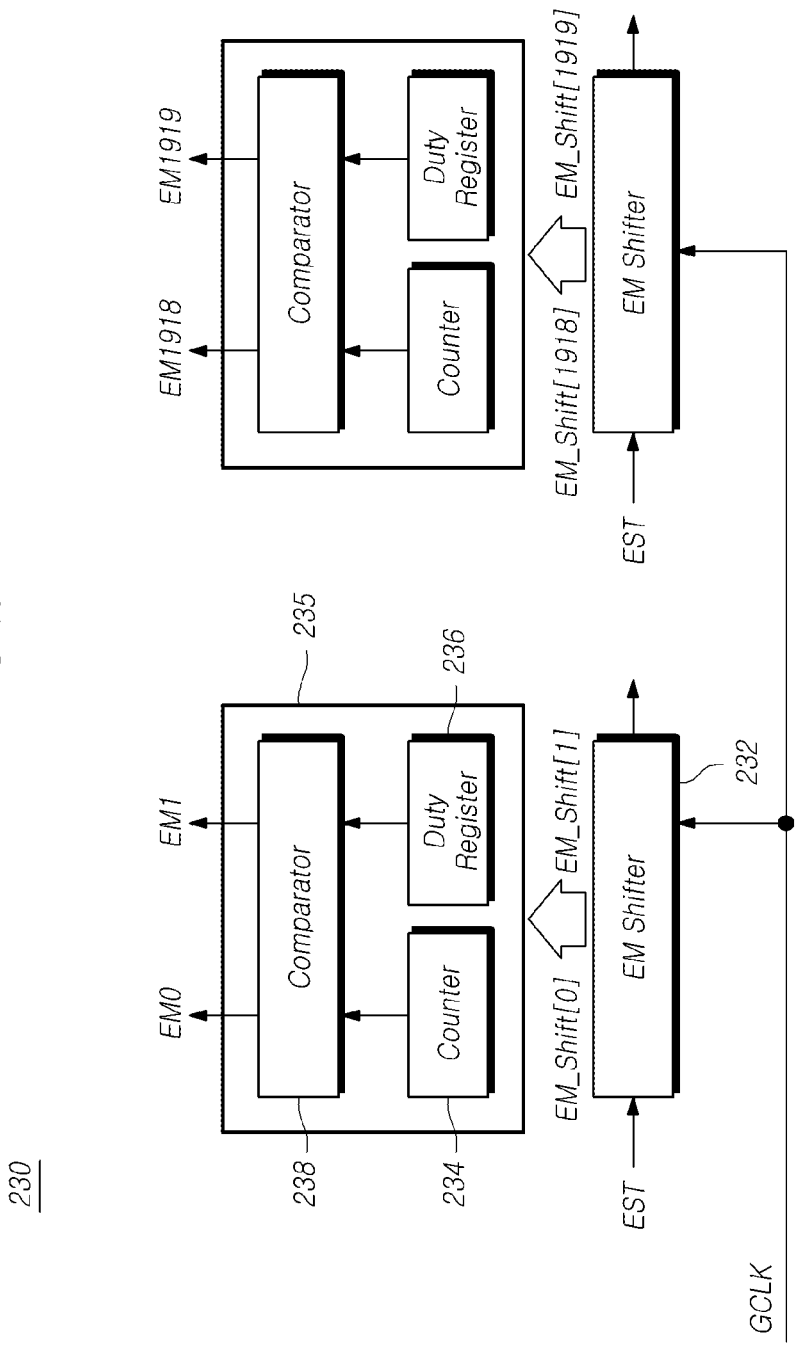
FIG. 9 is a block diagram illustrating an internal configuration of the driver circuit in the micro-display device according to aspects of the present disclosure.

FIG. 9 is a block diagram illustrating an internal configuration of the EM driver circuit in the micro-display device according to aspects.

Referring to FIG. 9, in the micro-display device according to the present disclosure, the EM driver circuit 230 may be horizontally disposed above or below the pixel array PXA, on the opposite side to the gate driver circuit 220 with respect to the pixel array PXA, such that the gate driver circuit 220 and the EM driver circuit 230 face each other. The EM driver circuit 230 may include an EM shifter 232 and an EM controller 235.

The plurality of EM shifter 232 may be connected in series to generate EM shift signals EM_Shift[0], EM_Shift[1], . . . , and EM_Shift[1919] shifted by time intervals of a single horizontal period 1H from the gate clock signal GCLK in response to the EM timing control signal EST. Here, the EM shift signals EM_Shift[0], EM_Shift[1], . . . , and EM_Shift[1919] are signals sequentially shifted by intervals of the single horizontal period 1H, and have the same period and duty ratio.

A single EM shifter 232 may be disposed for each of the emission signal lines EL, or may be connected to a group of two or more emission signal lines EL. Thus, in the micro-display device including 1,920 gate lines GL, the EM shifter 232 can set maximum 1,920 EM shift signals. In addition, a variety of groups of EM shift signals, such as two EM shift signals, four EM shift signals, and 480 EM shift signals, may be provided. In addition, the EM shifter 232 can generate the EM shift signals EM_Shift[0], EM_Shift[1], . . . , and EM_Shift[1919] using not only the gate clock signal GCLK, but also a source clock signal SCLK.

The EM controller 235 receives a single or a plurality of EM shift signals EM_Shift from the EM shifter 232 and generates emission signals EM0, EM1, . . . , and EM1919, which are provided according to the gate lines GL. Here, the emission signals EM0, EM1, . . . , and EM1919 may have different duty ratios according to the emission signal lines EL. In this regards, duty data used to set the emission times ET according to the emission signal lines EL may be stored in the form of a lookup table. Here, the duty data may be stored in a memory disposed in the circuit zone of the silicon substrate 210. More particularly, the memory may be located within the control circuit 250.

For example, if first duty data used to determine an emission time ET0 of a first emission signal line EL0 is set to be 100, second duty data used to determine an emission time ET1 of a second emission signal line EL1 may be set to be 110, which is greater than 100. If the duty data is increased by 10 for every emission signal line EL as described above, 1,920$^{th}$ duty data used to determine an emission time ET1919 of a 1,920$^{th}$ emission signal line EL1919 may be set to be 19,30.

The duty data may be increased by the same interval or different intervals according to the respective emission signal lines EL or the respective gate lines GL connected to the emission signal lines EL. In addition, the duty data for the emission signal lines EL may be data statistically determined on the basis of the degree of voltage drop in the subpixels SP obtained during testing.

A duty register 236 can receive duty data stored in the memory in the form of a lookup table, and transfer the duty data to a comparator 238. A counter 234 can count reference counter clock signals, and transfer the counted value to the comparator 238. The reference counter clock signals may be, for example, the gate clock signals GCLK or the source clock signals SCLK, or may be obtained by dividing such clock signals into a group comprised of a predetermined number of signals.

If the counted value transferred from the counter 234 is greater than the duty data transferred from the duty register 236, the comparator 238 can transit the emission signal EM to a high level, thereby completing the emission time ET.

In a case in which a single EM shifter 232 and a single EM controller 235 control two emission signals EM in the micro-display device including the 1,920 emission signal lines EL, 960 EM shifters 232 and 960 EM controllers 235 may be used.

Figure 10:
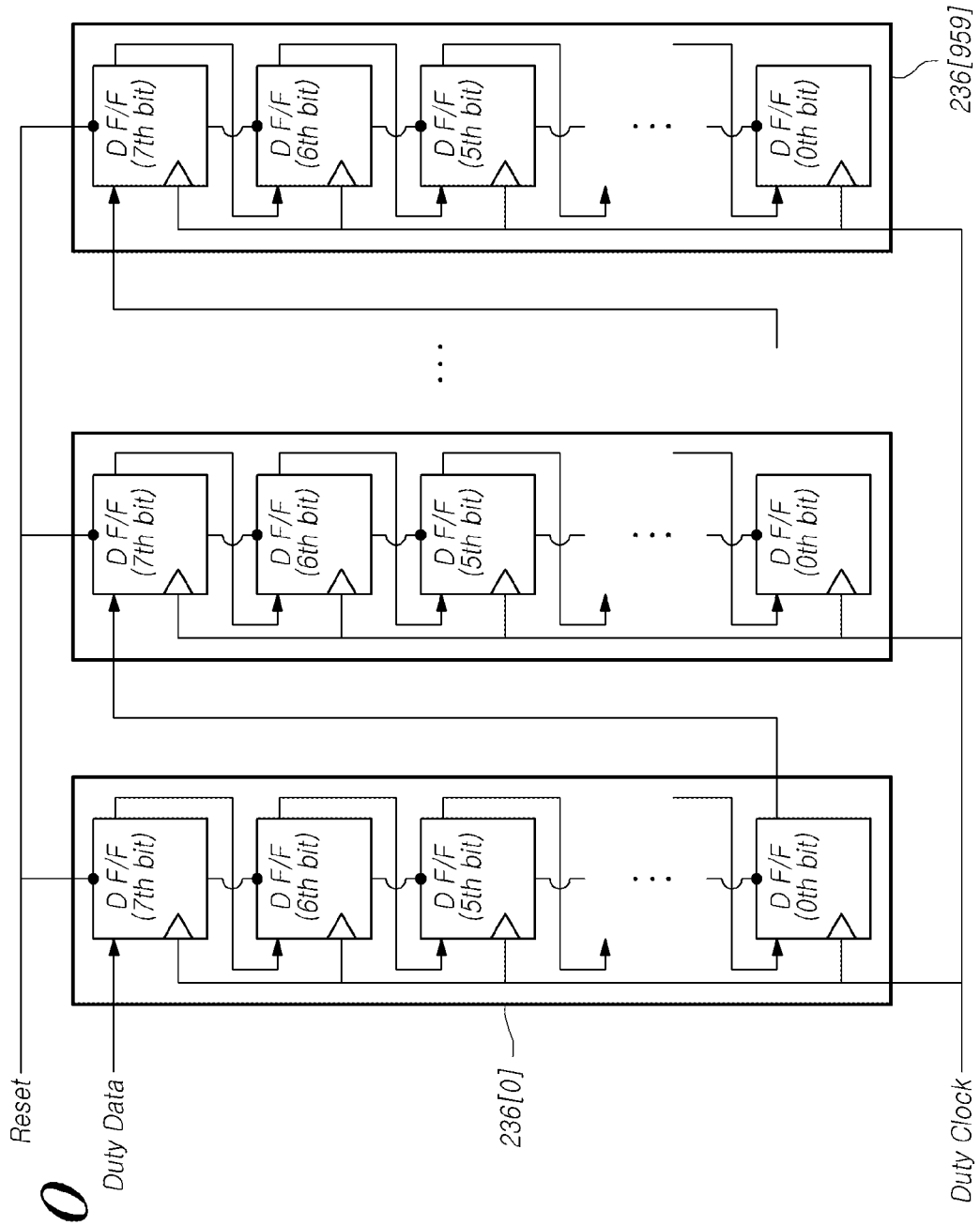
FIG. 10 is a block diagram of the duty register of the driver circuit in the micro-display device according to aspects of the present disclosure.
Figure 11:
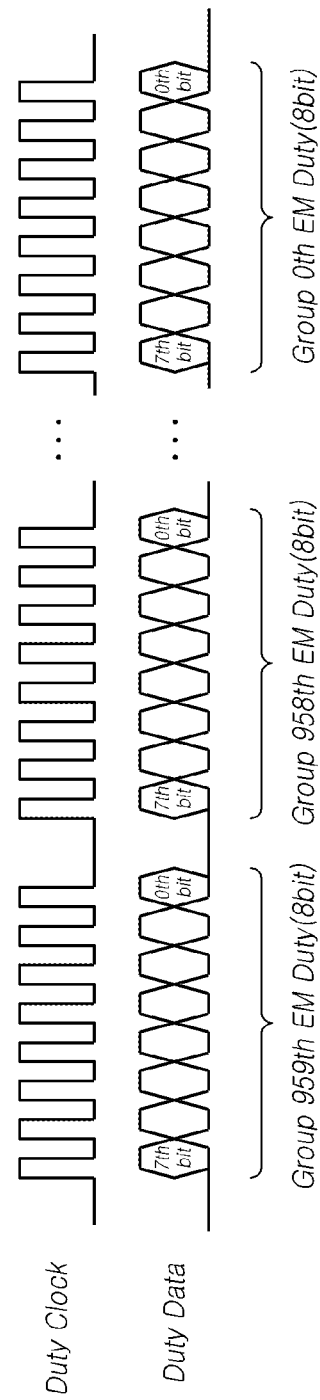
FIG. 11 is a signal flow diagram illustrating flows of the duty data in the micro-display device according to aspects of the present disclosure.

FIG. 10 is a block diagram of the duty register of the EM driver circuit in the micro-display device according to aspects, and FIG. 11 is a signal flow diagram of the duty data.

In an example case in which the micro-display device has a 1,920×1,200 resolution, the gate lines GL may be comprised of 1,920 lines due to the gate driver circuit 220 disposed above or below the pixel array PXA, and the emission signal lines EL may also be comprised of 1,920 lines due to the EM driver circuit 230 located opposite to the gate driver circuit 220 with respect to the pixel array PXA.

Here, in a case in which an EM shifter 232 and an EM controller 235 are provided for every emission signal line EL, 1,920 EM shifters 232 and 1,920 EM controllers 235 may be used. In a case in which an EM shifter 232 and an EM controller 235 are provided for every two emission signal lines EL, 960 EM shifters 232 and 960 EM controllers 235 may be used. As illustrated in FIG. 9, the EM shifter 232 and the EM controller 235 are provided for every two emission signal lines EL. Accordingly, 960 duty registers 236[0], . . . , and 236[959] may be used in a case in which two emission signals EM are generated using a single EM shifter 232 and a single EM controller 235.

The duty data used to determine the emission time ET of the emission signal lines EL may be comprised of a variety of bits of data. Here, a case in which a single duty register 236 is provided by connecting eight flip flops in series, on the assumption that the duty data is comprised of 8-bit data, will be described by way of example. The duty data is sequentially transferred from the first duty register 236[0] to the 960th duty register 236[959] by the unit of 8 bits, on the basis of the duty clocks. Accordingly, each of the comparators 238 in the EM controller 235 can compare the duty data, transferred from the duty register 236, and the number of gate clock signals GCLK, counted by the counter 234, and transit the emission signal EM at a point in time at which the number of the gate clock signals GCLK is the same as or greater than the duty data, thereby completing the emission time ET.

Figure 12:
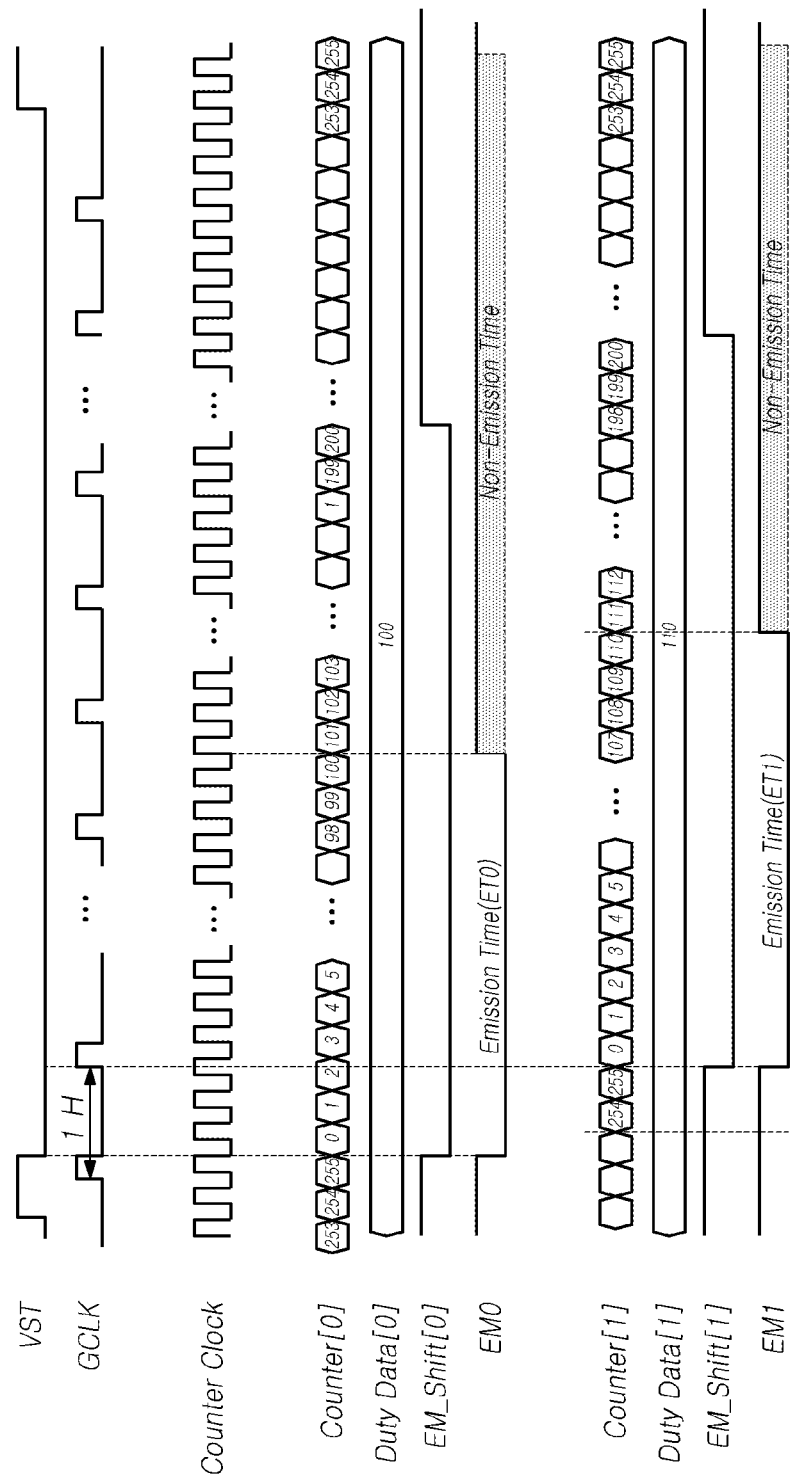
FIG. 12 is a signal timing diagram illustrating the emission time of a gate line in the micro-display device according to aspects of the present disclosure.

FIG. 12 is a signal timing diagram illustrating the emission time of a gate line in the micro-display device according to aspects of the present disclosure.

Referring to FIG. 12, the emission signal EM according to the present disclosure can be sequentially shifted for every emission signal line EL by the unit of a single horizontal period 1H of the gate clock signal GCLK. Here, the unit by which the emission signal EM is shifted may be determined on the basis of not only the gate clock signal GCLK but also other clock signals.

The counter 234 in the EM controller 235 can count counter clocks. The counter clocks are values that are to be compared with duty data to determine the emission time ET of the emission signal EM. Accordingly, the counter 234 can sequentially count the counter clocks, and if the counted value of the counter clocks is the same as or greater than the duty data stored in the duty register 236, transit the emission signal EM from a low level to a high level, thereby completing the emission time ET.

As described above, the EM shifter 232 and the EM controller 235 may be provided for every emission signal line EL, or the EM shifter 232 and the EM controller 235 may be provided by arranging a plurality of emission signal lines (e.g. EL0 and EL1) in a single group.

Here, in an example case, duty data for the first emission signal line EL0 may be set to be 100, and duty data for the second emission signal line EL1 may be set to be 110. In the process of counting the counter clocks, if the counted number of the counter clocks is smaller than the duty data, the first counter 234[0] can maintain the emission signal EM0 at a low level, thereby continuously turning the subpixel SP on. At a point in time at which the number of the counter clocks counted by the first counter 234[0] is 100, corresponding to the duty data, the emission signal EM0 can be transited to a high level, thereby completing the emission time ET. Accordingly, the emission time ET0 of the first emission signal line EL0 will be a time interval of 100 counter clocks.

Here, since the duty data stored in the second duty register 236[1] is set to be 110, the emission time ET1 of the second emission signal line EL1 is a time interval of 110 counter clocks, and thus, the emission time ET1 of the second emission signal line EL1 is longer than the emission time ET0 of the first emission signal line EL0. As described above, the farther the gate line GL or the emission signal line EL is located from the control circuit 250 or the power circuit, the longer the emission time ET can be controlled to be. Accordingly, a reduction in the data voltage VDATA or driving voltage applied to the subpixel SP, located remote from the control circuit 250 or the power circuit, due to the resistance component of the electric line, as well as resultant luminance reduction, can be compensated for.

The foregoing descriptions and the accompanying drawings have been presented in order to explain certain principles of the present disclosure by way of example. A person having ordinary skill in the art to which the present disclosure relates could make various modifications and variations without departing from the principle of the present disclosure. The foregoing aspects disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

What is claimed is:

1. A micro-display device comprising:
   a silicon substrate in which a plurality of gate lines, a plurality of data lines, a plurality of emission signal lines, and a plurality of subpixels are disposed;
   a gate driver circuit disposed on a first side of a pixel array to drive the plurality of gate lines;
   an emission driver circuit driving the plurality of emission signal lines and disposed on a second side of the pixel array different from the first side of the pixel array where the gate driver circuit is disposed;
   a data driver circuit disposed on a third side of the pixel array to drive the plurality of data lines;
   a memory storing duty data regarding duty ratios of an emission signal applied to the plurality of emission signal lines; and
   a control circuit controlling signals applied to the gate driver circuit, the data driver circuit and the emission driver circuit,
   wherein the control circuit is set to have different emission times with respect to subpixels connected to the plurality of emission signal lines,
   wherein the duty data corresponding to a first subpixel of the plurality of subpixels is greater than the duty data corresponding to a second subpixel of the plurality of subpixels, and wherein a distance between the first subpixel and the data driver is greater than a distance between the second subpixel and the data driver, wherein the emission driver circuit comprises:

at least two emission shifters each sequentially shifting the emission signal and supplying the shifted emission signal to one or more of the plurality of emission signal lines; and at least two emission controllers each controlling one or more of the emission times according to the one or more of the plurality of emission signal lines, the at least two emission controllers directly electrically connected to the at least two emission shifters respectively, wherein the at least two emission shifters respectively connected to either two or more groups each including the one or more of the plurality of emission signal lines, or one of the plurality of emission signal lines, and wherein the at least two emission controllers each comprises:

a duty register receiving the duty data used to determine one or more emission times corresponding to the one or more of the plurality of emission signal lines and stored in the memory;

a counter counting counter clock signals; and a comparator comparing a counting value, obtained by counting the counter clock signals by the counter, with the duty data, if the counting value is smaller than the duty data, maintaining the emission signal at a level, at which the subpixels are turned on, and if the counting value is equal to the duty data, transiting the emission signal to a level, at which the subpixels are turned off.

2. The micro-display device according to claim 1, wherein the memory is disposed within the control circuit.

3. The micro-display device according to claim 1, wherein the duty data has a different value on at least two emission signal lines.

4. The micro-display device according to claim 3, wherein the duty data is determined such that an emission signal line located farther from the data driver circuit has a longer emission time.

5. The micro-display device according to claim 1, wherein the counter clock signals are generated from a gate clock signal or a source clock signal.

6. An emission driver circuit disposed on a silicon substrate in which a plurality of gate lines, a plurality of data lines, a plurality of emission signal lines, and a plurality of subpixels are disposed, opposite to a gate driver circuit with respect to a pixel array, to drive the plurality of emission signal lines, the gate driver circuit driving the plurality of gate lines, the emission driver circuit comprising:

at least two emission shifters each sequentially shifting an emission signal and supplying the shifted emission signal to one or more of the plurality of emission signal lines; and at least two emission controllers each controlling an emission time of the emission signal using duty data having different values according to one or more of the plurality of emission signal lines, the at least two emission controllers directly electrically connected to the at least two emission shifters respectively, wherein the duty data corresponding to a first subpixel of the plurality of subpixels is greater than the duty data corresponding to a second subpixel of the plurality of subpixels, wherein a distance between the first subpixel and the data driver is greater than a distance between the second subpixel and the data driver, wherein the at least two emission shifters respectively connected to either two or more groups each including one or more of the plurality of emission signal lines, or one of the plurality of emission signal lines, and wherein the at least two emission controllers each comprises:

a duty register receiving the duty data used to determine one or more emission times corresponding to the one or more of the plurality of emission signal lines and stored in the memory;

a counter counting counter clock signals; and a comparator comparing a counting value, obtained by counting the counter clock signals by the counter, with the duty data, if the counting value is smaller than the duty data, maintaining the emission signal at a level, at which one or more corresponding subpixels are turned on, and if the counting value is equal to the duty data, transiting the emission signal to a level, at which the one or more subpixels are turned off.

7. The micro-display device according to claim 6, wherein the duty data has a different value at least two emission signal lines.

8. The micro-display device according to claim 6, wherein the duty data is determined such that an emission signal line located farther from the data driver circuit has a longer emission time.

9. The emission driver circuit according to claim 6, wherein the counter clock signals are generated from a gate clock signal or a source clock signal.

10. A method of driving a micro-display device including a silicon substrate in which a plurality of gate lines, a plurality of data lines, a plurality of emission signal lines, and a plurality of subpixels are disposed, the method comprising:

applying an emission signal by sequentially shifting the emission signal using at least two emission shifters according to the plurality of emission signal lines;

receiving duty data having different values according to the plurality of emission signal lines;

counting counter clock signals;

comparing a counting value, obtained by counting the counter clock signals, with the duty data; and if the counting value is smaller than the duty data, maintaining the emission signal at a level, at which one or more corresponding subpixels are turned on, and if the counting value is equal to the duty data, transiting the emission signal, applied to a corresponding emission signal line among the plurality of emission signal lines, to a level, at which the one or more subpixels are turned off, wherein the duty data corresponding to a first subpixel of the plurality of subpixels is greater than the duty data corresponding to a second subpixel of the plurality of subpixels, wherein a distance between the first subpixel and the data driver is greater than a distance between the second subpixel and the data driver, and wherein the emission driver circuit comprises:

at least two emission controllers each controlling one or more of the emission times according to one or more of the plurality of emission signal lines, the at least two emission controllers directly electrically connected to the at least two emission shifters respectively, wherein the at least two emission shifters respectively connected to either two or more groups each including the one or more of the plurality of emission signal lines, or one of the plurality of emission signal lines, and wherein the at least two emission controllers each comprises a duty register receiving the duty data used to determine one or more emission times corresponding to the one or more of the plurality of emission signal lines and stored in the memory.

11. The method according to claim 10, wherein the duty data is determined such that an emission signal line located farther from a data driver circuit has a longer emission time.

12. The micro-display device according to claim 1, wherein the duty data is configured to be increased by a predetermined value for each of the two or more groups.

* * * * *